United States Patent Office 3,434,971
Patented Mar. 25, 1969

3,434,971
**COMPOSITION AND METHOD FOR
ACIDIZING WELLS**
Bobby L. Atkins, Lake Jackson, Tex., assignor to The
Dow Chemical Company, Midland, Mich., a corporation of Delaware
No Drawing. Filed Aug. 25, 1965, Ser. No. 482,621
Int. Cl. C09k *3/00;* E21b *43/27;* C08f *19/00*
U.S. Cl. 252—8.55                                    8 Claims

ABSTRACT OF THE DISCLOSURE

An aqueous well acidizing or combined acidizing fracturing composition and method of acidizing subterranean limestone formations employing said composition. The acidizing composition contains in addition to the aqueous acid a polymer prepared by copolymerizing acrylamide and N-vinyl pyrrolidone with a specified amount of a diolefinic crosslinking agent, said polymer being employed to reduce the fluid loss and friction loss of the composition.

---

The invention pertains to the treatment of subsurface geologic formations and particularly to the treatment of such formations comprised of fluid-bearing strata penetrated by a wellbore wherein an acidic composition is injected down the wellbore and into contact with said strata. An acidic composition is employed to bring about chemical reaction between lime-containing rock in the strata, whereby passageways for fluid are created or existent passageways therein are enlarged. Such treatment is often designated acidizing a well since the term well is often used to include both the borehole and that portion of the formation served by the well, i.e. that portion of the formation which has fluid communication or can be made to have fluid communication with the wellbore. A brine may be employed as the aqueous medium in acidizing where a higher density aqueous medium than water is desired.

Acidizing may be carried out at an injection pressure sufficiently great to create fractures in the formation which have the desired advantage of opening up passageways into the formation along which the acid can travel to more remote areas from the wellbore. Acidizing may also be carried out at pressures less than those which create fractures but which merely cause the acidizing composition to be brought into contact with the formation, such acidizing being known as matrix acidizing.

Acidizing has been proven to be a very successful procedure for stimulaitng the production of oil, water, brines, and gases from a well.

Many problems associated with acidizing have been met and an encouraging extent of progress made in the solution of a number of such problems. For example, ways of lessening the corrosion of metal parts of well equipment due to acidic attack have been suggested. Steps have been made to lessen the excessive loss of treating fluid into the more porous portions of the formation which results in loss of efficacy of the acid treatment on the fluid-bearing portions. Desirable delay of the rate of acidic attack has been attained by employing retardants in the acid composition, so that areas of the formation more remote from the wellbore will be acidized as well as those in the immediate vicinity thereof. Some progress has been made in reducing the energy required in acidizing operations due to friction of the injected fluids while being injected, this usually being referred to as friction loss.

A particular problem has been associated with acidizing because a number of additives, suitable for reducing fluid and friction losses in water, oil, or emulsions thereof, have been unsatisfactory for use in brine or acid compositions. Polymeric agents attempted to be used for this purpose have tended to degenerate in acid. Others which have resisted degeneration have plugged the pores of the formation and defeated the objectives of the treatment.

Many of the fluid loss or friction loss control agents attempted to be employed in brines have been unsatisfactory because some extent of swelling is usually desirable in the additive and, in the case of brines, such otherwise desirable additives do not swell sufficiently.

However, the problems of undesirable fluid loss of the acidizing or fracturing composition to the formation and energy loss due to turbulence in the injected acid or brine composition have not been adequately solved and a need exists for more effective control of fluid loss to the formation and more effective control of friction loss during injection.

The invention meets this need by providing an improved method of acidizing a well, wherein both fluid loss and friction loss are markedly lessened when employing acids or brines. The method of the invention provides a method of acidizing a formation, wherein the areas more remote from the wellbore are acidized, a more uniform acidization is obtained, and the time and materials necessary for an acidizing treatment are lessened. The treatment of the invention also lessens the energy requirements. In other words, it reduces the power necessary for injection at a given rate or provides a larger treating area than is normally attainable at the same power. If desired, the invention also provides acidizing at pressures sufficiently high to create fractures in the formation during acidizing with little or no additional horsepower beyond that often requred for matrix acidizing under comparable conditions. The practice of the invention has the added advantage of ease and simplicity of preparation because the additive required to be employed in the practice of the invention is more readily dispersed in aqueous salt and acid solutions than other additives usually employed in attempts to attain the same purposes as herein attained.

The invention encompasses and includes a method of acidizing, or combined acidizing and fracturing, a formation penetrated by a wellbore which comprises injecting down the wellbore and into contact with the formation a composition consisting essentially of an aqueous acid treating fluid, including acids in brine, which reacts chemically with rock in the formation, and which contains dispersed therein between about 4 pounds and 85 pounds, per 1000 gallons of treating fluid (or between about 0.05% and 1.0% by weight) of a copolymer of acrylamide and N-vinylpyrrolidone prepared by polymerizing weight proportions of between about 30% and about 70% of acrylamide and between about 70% and 30% of N-vinylpyrrolidone with a specified amount of a suitable cross-linking agent in the presence of a suitable catalyst. The acidic solution preferably contains an inhibitor to corrosive attack of acid on metal whch may be any one of such known inhibitors, e.g. a compound of nitrogen, arsenic, or sulfur as broadly described in the Grebe et al. U.S. Patent Number 1,877,504 or a rosin amine type inhibitor as described in U.S. Patent Number 2,758,970. The amount of inhibitor is not highly critical, the amount employed usually being defined broadly as a small but effective amount, e.g., between about 0.05% and about 1.5% by weight of the aqueous acidic solution. Illustrative of an inhibitor to employ in the practice of the invention is that prepared by reacting a rosin amine formaldehyde and acetophenone in the presence of hydrochloric acid as a catalyst as described in detail in U.S. Patent 2,758,970. Treatment may be carried out at any temperature between about 30° F. and about 300° F. (i.e. between about −1.1° C. and about 149° C.).

The preferred amount of the copolymer to use is between about 10 pounds and about 50 pounds per 1000 gallons of the treating fluid or between about 0.12% and 0.6% by weight. About 15 to 25 pounds per 1000 gallons are commonly used. Less than 15 pounds permits some undesirable fluid loss and more than 50 pounds per 1000 gallons sometimes presents pumping problems.

In the preparation of the polymer required for use in the practice of the invention, a cross-linking agent and a polymerization catalyst are employed. The preferred proportion of the monomers to use in the preparation of the polymer is that consisting by weight of between about 55% and 65% of acrylamide, between about 45% and 35% of N-vinylpyrrodidone, to make 100% by weight of monomers. The amount of cross-linking agent to employ should be greater than 0.04% but not more than 1.0%, based on the dry weight of the monomers. An effective amount of a polymerization catalyst to employ is small, e.g. between about 0.1 and 1.0%, based on the dry weight of the monomers present.

The selected proportions within the limits set out above of acrylamide and N-vinylpyrrodidone are admixed with water to make between about a 5 and 50%, and preferably between about 10% and 20% by weight aqueous dispersion thereof. A cross-linking agent, e.g. N,N′-methylenebisacrylamide, in the amount greater than .04% and not more than 1.0% (usually added as a 1 to 3% aqueous solution thereof) and the polymerization catalyst up to about 1.0%, by weight of the dry monomers, are admixed therewith in a suitable reaction vessel and the vessel purged of air by passing an inactive gas therethrough, nitrogen usually being employed. The reaction mixture is then preferably heated to between about 50° and 70° C., accompanied by more-or-less continuous stirring for between about 3 to 5 hours. A gelatinous polymer forms, it is removed and dried and then flaked or powdered, as by drying in a revolving drum drier.

To carry out the invention, an aqueous solution, e.g. from 3% to 35% HCl dissolved in water, is prepared. An inhibitor, as described herein above, to the corrosion of acid on metal is usually admixed therewith at this time. The polymer made, substantially as described above, is admixed with the aqueous acid solution by means of a blender, e.g. a continuous mixer such as a truck-mounted revolving tank provided with paddles, or by being injected down the well penetrating the formation, in an amount within the range suggested hereinabove. The polymer disperses quickly, i.e. within a few seconds when aided by mild agitation. The composition so made is then forced, usually by means of a suitable pumping system, down the wellbore and into contact with the formation. The pressure employed rests within the discretion and needs of the user. It may be at a pressure sufficient to merely penetrate the formation or it may be of sufficient force to overcome the weight of the overburden and create fractures in the formation. If desired, a propping agent (to prop open fractures as created), e.g. 20 to 60 mesh sand in accordance with known fracturing procedures, may be admixed with the aqueous acid solution. It is usually advisable to retain the acidic solution in contact with the formation until the acid therein has been substantially depleted by reaction with the formation. The time is usually from 1 to a few hours. Thereafter, the substantially spent treating composition is reversed out of the well, i.e. allowed to flow back out or be pumped out of the formation.

A polymer illustrative of the type used in the practice of the invention was prepared as follows:

180 grams of acrylamide and 120 grams of N-vinylpyrrolidone were admixed with 1667 milliliters of water containing 0.9 gram of $\alpha,\alpha'$-azobisisobutyronitrile as a polymerization catalyst and 0.15 gram (about 0.075%) of N,N′-methylenebisacrylamide (added as a 2% aqueous solution) as a cross-linking agent, in a suitable polymerization vessel. The vessel and contents were purged of air and oxygen by forcing nitrogen gas therethrough. Thereafter, a blanket of nitrogen gas was maintained on the reduction mixture. Temperature of the reaction mixture was raised and maintained at between 60° and 70° C., accompanied by more-or-less continuous stirring over a period of 4 hours. A gelatinous appearing polymer formed, was removed, and placed in a revolving drum drier where it was simultaneously dried and flaked. The polymer so made comprised copolymerized acrylamide and N-vinylpyrrolidone in proportions by weight of 60% acrylamide and 40% N-vinylpyrrolidone.

The following examples show the efficacy of the polymer so made as a fluid loss additive in limestone rock.

EXAMPLE 1

One-inch diameter natural Bedford limestone cores having a permeability in air of between 0.3 and 1.0 millidarcy, 3-inches in length, were saturated with a 10% weight NaCl aqueous brine solution. They were then placed in a Hassler sleeve assembly which is standard apparatus employed for the purpose of testing fluid loss in formation cores. The apparatus includes a fluid-tight reservoir provided with an inlet leading from a source of gas and mounted above and connected to the vertically positioned Hassler sleeve. The sleeve is closed except for an inlet to the upper end and an outlet from the lower end substantially centrally positioned. The sleeve is composed of a strong but elastic material and is provided with an hydraulic liquid about its circumferential face of such magnitude as to prevent any passage of liquid between the core and the elastic sleeve. A graduated vessel is positioned beneath the outlet end. The flow from the reservoir to the sleeve and from the sleeve to the graduated vessel are controlled by valves.

To carry out the test, the Hassler apparatus was placed in an oven at 200° F. The valves were closed and 200 millimeters of 15% by weight hydrochloric acid were heated to 200° F. and put in the reservoir. Then 0.6 gram of the polymer prepared, as above described, was admixed therewith. (This amount is equivalent to 25 pounds of polymer per 1000 gallons of aqueous acid.) The mixture of copolymer and aqueous acid was stirred for about 3 minutes to insure complete wetting of the polymer. Nitrogen gas was then applied, at a pressure of 1000 pounds per square inch gauge (p.s.i.g.), to the aqueous acid solution containing the polymer in the reservoir to provide pressure to simulate pressure conditions in a subterranean formation being treated. The valves were then opened and the pressure on the acidic solution in the reservoir permitted to force some of the acidic solution into and through the core. The volume of liquid which passed through the core and collected in the graduated vessel during a period of 25 minutes was observed and recorded. The rate of flow over the 25 minute period was also observed and recorded. The temperature of the fluid and core was maintained at 200° F. and the pressure on the reservoir was maintained at 1000 p.s.i.g. throughout the test. The test was then discontinued.

The following table sets forth the results obtained in the test.

Table I

| Time intervals in minutes between readings | Non-cumulative volumes of liquid through the core between readings in milliliters |
|---|---|
| 1 | 0 |
| 4 | 0 |
| 9 | 1.6 |
| 16 | 2.2 |
| 25 | 2.8 |

It may be readily observed from the above table that it required about 4 minutes for the aqueous solution containing the polymer to pass through the three-inch long core at 1000 p.s.i.g. It further shows that, after the fluid had passed through the core, the volumes collected during the successive testing periods increased but slightly. For example, at 9 minutes the amount collected was 1.6 milliliters and at 25 minutes the amount collected was only 2.8 milliliters. It is recognized in the well treating art that a fluid loss value, obtained in a core of less than 1 millidarcy permeability in air by use of the Hassler sleeve, of no greater than 5 milliliters in 25 minutes is fully satisfactory. It can therefore be noticed that the above examples which permitted only 2.8 milliliters to pass through in the 25 minute period was well within recommended fluid loss control.

EXAMPLE 2

To show that the copolymer required to be used in the practice of the invention must be employed within the weight proportions of monomers above prescribed, proportions of each monomer outside and within that prescribed were employed in this example which was carried out as follows:

The weights of the monomers were polymerized as in Example 1 except for the variation in amounts of monomers and cross-linking agent employed. Bedford cores having a permeability in air of less than 1 millidarcy were saturated in 10% by weight NaCl brine as in Example 1 and placed in the Hassler sleeve. Samples, 200 milliliters in size, of 15% by weight HCl in water, containing 0.6 gram of the copolymer were individually tested in the Hassler sleeve as in Example 1, except that only the final volumes through the core at the end of the 25-minute period were recorded.

The results are shown in Table II below.

per 100% of the monomeric mix is undesirable (although operable) because of its longer hydration time.

EXAMPLE 3

This example was conducted to show the effect of employing polymers, in well treating compositions, prepared by varying the amount of cross-linking agent, employed in a 60% acrylamide and 40% N-vinylpyrrolidone monomeric mixture containing about 0.3% of azobisisobutyronitrile polymerization catalyst according to the general polymerization procedure employed above. The copolymer was admixed with 15% hydrochloric acid as in the example above and the resulting so treated acid tested in the Hassler sleeve by forcing it into and through Bedford cores. The results are shown in Table III.

TABLE III

| Percent MBA [1] | Temperature, ° F. | Total Volume through Core in ml. in 25 min. | Observed Results |
|---|---|---|---|
| 0.03 | 200 | ([2]) | Soluble. |
| 0.04 | 200 | 2.0 | Soluble in 1 hour. |
| 0.05 | 240 | 1.6 | Remained satisfactorily dispersed. |
| 0.06 | 200 | 3.5 | Do. |
| 0.075 | 200 | 2.3 | Do. |
| 0.10 | 200 | 3.3 | Do. |
| 0.30 | 200 | 4.4 | Do. |
| 0.70 | 200 | 5.2 | Do. |

[1] MBA=N,N'-methylenebisacrylamide used as cross-linking agent.
[2] Failed.

The results in Table III show that the extent of cross-linking is significant in preparing a suitable copolymer for the practice of the invention; it shows that the amount of cross-linking agent should be greater than 0.04% but not more than 1.0% based on the weight of the monomers present.

Polymers prepared above by employing 0.10 and 0.70% of N,N'-methylenebisacrylamide, admixing the polymer so made in 15% by weight aqueous HCl, and testing the fluid loss control properties in limestone cores were repeated except the temperature employed in each instance was 80° F. The volumes through the cores in 25 minutes were 3 ml. when the polymer employed was that prepared by using 0.10% cross-linking agent and 4.4 ml. when the polymer employed was that prepared by using 0.7% cross-linking agent.

Other cross-linking agents, e.g. divinyl benzene, or other diolefins which provide comparable pairs of double bonds to cross-link the acrylamide or N-vinylpyrrolidone may be employed. Any suitable peroxygen or redox type catalyst may be employed. Among such catalysts are persulfates and peroxides of an alkali metal. Illustrative of the redox type catalysts are hydrogen peroxide together with a ferrous ion-yielding source.

TABLE II

| Composition of Copolymer,[1] Percent | | | Temp. in ° F. | Total Volume Through Core in ml. in 25 minutes | Observed Results |
|---|---|---|---|---|---|
| AA | VP | MBA | | | |
| 75 | 25 | 0.05 | 80 | 2.9 | Polymer precipitated from solution at temperature above 125° F. |
| 70 | 30 | 0.05 | 200 | 3.4 | Polymer precipitated from solution at temperature above 150° F. |
| 60 | 40 | 0.05 | 200 | 2.8 | No insoluble precipitate formed; satisfactory at elevated temp. |
| 50 | 50 | 0.075 | 200 | 3.2 | Do. |
| 40 | 60 | 0.10 | 200 | 4.2 | Requires a somewhat longer hydration time but otherwise acceptable. |

[1] AA = Acrylamide; VP = N-vinylpyrrolidone; MBA = N,N'-methylenebisacrylamide, cross-linking agent.
NOTE.—About 0.3% by weight α,α-azobisisobutyronitrile was employed as polymerization catalyst.

Reference to Table II shows that 75% acrylamide and 25% N-vinylpyrrolidone polymer is not fully satisfactory at above 125° F. It also shows that 70% acrylamide and 30% N-vinylpyrrolidone polymer is not fully satisfactory at above 150° F. Accordingly, it is recommended that the copolymer be made by employing at least 60% acrylamide unless the temperature of the formation being treated is below about 150° F. The table also shows that a polymer made by employing 60% or more N-vinylpyrrolidone

EXAMPLE 4

This example was run to show the efficacy of the practice of the invention to reduce friction loss of brines and acids while being moved along a conduit, as for example, when being injected down the tubing of a wellbore. The brine employed in the example consisted of 8 percent NaCl and 2.5 percent $CaCl_2$, by weight, dissolved in water. The acid employed consisted of a 15 percent HCl by weight dissolved in water. The polymer employed was that prepared above, viz. by admixing, by weight 60 percent acrylamide and 40 percent N-vinylpyrrolidone and copolymerizing with 0.05 percent of methylenebisacrylamide in the presence of 0.3 percent $\alpha,\alpha'$-azobisisobutyronitrile as a catalyst in sufficient water to make about a 15 percent aqueous solution.

To portions of each of the brine and hydrochloric acid prepared above were admixed sufficient copolymer to result in the number of pounds of the copolymer per 1000 gallons of the brine and of the acid shown in Table IV, infra. The friction loss results were obtained by measuring the power requirements to maintain a flow of the fluid being tested through a ¼″ diameter pipe at 14 gallons per minute. The power requirements of the brine or acid without additive is considered 100 percent. The reduction in friction or friction reduction is given in the table as the percent less than the 100 percent that would be required were the friction loss control additive not present. For example a "Percent Friction Reduction" value shown in the table of 40.6 percent means that 100 minus 40.6 percent or only 59.4 percent as much power is needed as was required in the absence of the additive.

TABLE IV

| Test Fluid | Polymer Concentration in pounds per 1,000 gallons | Percent Friction Reduction In— | | | |
|---|---|---|---|---|---|
| | | 1 Min. | 5 Min. | 10 Min. | 15 Min. |
| Brine | 15 | 29.9 | 40.6 | 40.6 | 40.6 |
| Do | 25 | 41.3 | 41.3 | 41.3 | 41.3 |
| Acid | 15 | 36.4 | 41.7 | 41.7 | 41.7 |
| Do | 25 | 43.0 | 43.7 | 43.7 | 43.7 |

Reference to Table IV shows that the power needs are very definitely lessened for the liquids tested. It also shows that concentrations of polymer in the liquid of from 15 to 25 pounds of polymer per 1000 gallons of liquid is highly satisfactory. Such reduction in power needs is clearly of significant economic importance.

The following examples are illustrative of acidizing limestone oil-bearing formations in accordance with the practice of the invention.

EXAMPLE 5

The formation herein acidized was located in Lea County, New Mexico. The treatment was carried out by employing, in the acidizing composition, the polymer prepared by copolymerizing 60% acrylamide and 40% N-vinylpyrrolidone with 0.04% by dry weight of N,N'-methylenebisacrylamide as a cross-linking agent in the presence of 0.3% by weight of $\alpha,\alpha'$-azobisisobutyronitrile catalyst in an aqueous medium as a fluid loss control and friction loss control agent. The treatment was done by admixing 75 pounds of the polymer with 5000 gallons of 15% inhibited hydrochloric acid. Both the fluid loss of the acid solution to the formation and the friction loss during injection were less than are normally required by conventional practice.

EXAMPLE 6

Example 5 was repeated in a formation located in Ward County, Texas except that 125 pounds of the polymer employed in Example 5 were employed in 5000 gallons of 15% inhibited hydrochloric acid. Both the fluid loss of the treating fluid to the formation and friction loss during injection were lower than expected based upon conventional practice.

EXAMPLE 7

This example of the inventioin was performed in a formation in Andrews County, Texas. Acidizing was carried out employing 7500 gallons of acid composition consisting of 15% inhibited hydrochloric acid containing dispersed therein 200 pounds of the polymer employed in Examples 5 and 6. The results showed very satisfactory inhibition of fluid loss to the formation and reduction and friction loss during injection when compared to conventional practice.

EXAMPLE 8

A limestone oil-bearing formation in Ector County, Texas was acidized according to the practice of the invention employing 2500 gallons of the inhibited 15% by weight hydrochloric acid containing in admixture therewith 100 pounds of the copolymer employed in Examples 5, 6 and 7. The polymer was shown to be an excellent and practical inhibitor of fluid loss to the formation and of friction loss during injection.

In the above field examples the inhibitor to corrosivity employed was about 0.3% (by weight of the acid employed) of that defined in claim 1 of U.S. Patent No. 3,077,454.

Having described my invention what I claim and desire to protect by Letters Patent is:

1. An aqueous well acidizing composition having an acid content capable of attacking and dissolving limestone formations, wherein areas more remote from the well are more effectively acidized and the power required to force the aqueous solution into the formation is lessened, containing between about 0.05% and about 1.0% by weight of a polymer prepared by copolymerizing between about 30% and about 70% of each of acrylamide and N-vinylpyrrolidone, to make 100% by weight monomers, with a diolefinic crosslinking agent selected from the class consisting of methylenebisacrylamide and divinylbenzene in an amount between about 0.04% and about 1.0%, based on the dry weight of the monomers, and up to about 1% of a free radical polymerization catalyst, based on the dry weight of the monomers, polymerization being conducted in an aqueous solution comprising between about 5% and about 50% by weight of the aqueous polymerization solution.

2. The composition of claim 1 wherein the acid is a 3 to 35% aqueous solution of HCl.

3. The composition of claim 1 wherein the cross-linking agent is N,N'-methylenebisacrylamide in an amount of between about 0.04% and 0.7% and the catalyst is $\alpha,\alpha'$-azobisisobutyronitrile in an amount of between about 0.1 and 1.0 percent based on the weight of monomers employed.

4. The composition of claim 1 wherein the polymer is employed in an amount of between about 0.12% and 0.6% by weight of said aqueous acidic solution.

5. The method of acidizing a limestone fluid-bearing formation penetrated by a wellbore comprising injecting down the wellbore and into contact with the formation the composition of claim 1, maintaining said composition in contact with the wellbore for a time sufficient for the acid to chemically react with portions of the formation to etch passageways therethrough, and releasing pressure on the well to permit at least some of the composition so used to flow out of the well.

6. The method of acidizing a limestone fluid-bearing formation penetrated by a wellbore comprising injecting down the wellbore and into contact with the formation the composition of claim 2, maintaining said composition in contact with the wellbore for a time sufficient for the acid to chemically react with portions of the formation to etch passageways therethrough, and releasing pressure on the well to permit at least some of the composition so used to flow out of the well.

7. The method of acidizing a limestone fluid-bearing formation penetrated by a wellbore comprising injecting down the wellbore and into contact with the formation the composition of claim 3, maintaining said composition in contact with the wellbore for a time sufficient for the acid to chemically react with portions of the formation to etch passageways therethrough, and releasing pressure on the well to permit at least some of the composition so used to flow out of the well.

8. The method of acidizing a limestone fluid-bearing formation penetrated by a wellbore comprising injecting down the wellbore and into contact with the formation the composition of claim 4, maintaining said composition in contact with the wellbore for a time sufficient for the acid to chemically react with portions of the formation to etch passageways therethrough, and releasing pressure on the well to permit at least some of the composition so used to flow out of the well.

References Cited

UNITED STATES PATENTS

| | | |
|---|---|---|
| 3,025,234 | 3/1962 | Canterino. |
| 3,235,490 | 2/1966 | Goren. |
| 3,252,904 | 5/1966 | Carpenter. |

HERBERT B. GUYNN, *Primary Examiner.*

U.S. Cl. X.R.

166—42; 260—80.5